(12) United States Patent
Patel

(10) Patent No.: US 10,557,591 B2
(45) Date of Patent: Feb. 11, 2020

(54) SMART POWER OVER ETHERNET LIFT

(71) Applicant: CISCO TECHNOLOGY, INC., San Jose, CA (US)

(72) Inventor: Narendra Patel, Princeton, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/574,813

(22) Filed: Sep. 18, 2019

(65) Prior Publication Data

US 2020/0011480 A1 Jan. 9, 2020

Related U.S. Application Data

(62) Division of application No. 15/444,634, filed on Feb. 28, 2017, now Pat. No. 10,458,595.

(51) Int. Cl.
*F16M 13/00* (2006.01)
*F16M 13/02* (2006.01)
*F16M 11/18* (2006.01)
*F16M 11/04* (2006.01)

(52) U.S. Cl.
CPC ........ *F16M 13/027* (2013.01); *F16M 11/046* (2013.01); *F16M 11/18* (2013.01)

(58) Field of Classification Search
CPC .... F16M 13/027; F16M 11/046; F16M 18/18; H02C 3/20
See application file for complete search history.

(56) References Cited

U.S. PATENT DOCUMENTS

| | | | | |
|---|---|---|---|---|
| 6,637,711 B2 * | 10/2003 | Enochs | ................ | B66F 7/0666 248/277.1 |
| 7,631,848 B2 * | 12/2009 | Enochs | ................ | B66F 7/0666 248/277.1 |
| 10,474,014 B2 * | 11/2019 | Enochs | ................ | G03B 21/14 |

* cited by examiner

*Primary Examiner* — Amy J. Sterling
(74) *Attorney, Agent, or Firm* — Cindy Kaplan

(57) ABSTRACT

According to one aspect, an apparatus includes an actuator, a first portion, and the second portion is arranged to be coupled to a device. The second portion has a second conductive connector portion, wherein power is not provided to the actuator when the first conductive connector portion and the second conductive connector portion are in physical contact, and wherein the power is provided to the actuator when the first conductive connector portion and the second conductive connector portion are not in physical contact.

20 Claims, 8 Drawing Sheets

SMART POWER OVER ETHERNET LIFT

STATEMENT OF RELATED APPLICATION

The present application is a divisional of U.S. patent application Ser. No. 15/444,634 entitled "SMART POWER OVER ETHERNET LIFT", filed on Feb. 28, 2017. The content of this application is incorporated herein by reference in its entirety.

TECHNICAL FIELD

The disclosure relates generally to systems which utilize Power over Ethernet (PoE) solutions. More particularly, the disclosure relates to using PoE to facilitate the maintenance of ceiling-mounted devices.

BACKGROUND

Many enterprise environments utilize ceiling mounted equipment. For example, enterprise environments often mount wireless access points in ceilings. As many ceilings are relatively tall, in order to access ceiling mounted equipment for maintenance and/or replacement purposes, enterprises often must obtain lifts which allow individuals to reach the ceiling mounted equipment. As the costs associated with renting or otherwise acquiring lifts such as scissor lifts is substantial, it can be both expensive and time-consuming to perform maintenance on ceiling mounted equipment and/or to replace ceiling mounted equipment.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, an apparatus includes an actuator, a first portion, and the second portion is arranged to be coupled to a device. The second portion has a second conductive connector portion, wherein power is not provided to the actuator when the first conductive connector portion and the second conductive connector portion are in physical contact, and wherein the power is provided to the actuator when the first conductive connector portion and the second conductive connector portion are not in physical contact.

Description

The maintenance of equipment that is mounted in or on a ceiling is often time consuming and difficult. For example, equipment that is mounted in or on a ceiling is generally not easily accessible for maintenance purposes. Many enterprises purchase or rent apparatuses such as lifts to allow for physical access ceiling mounted equipment. The purchase or rental of lifts may be a significant cost.

The use of an apparatus which lowers a ceiling mounted device, e.g., to a floor or to an accessible height relative to the floor, may be less intrusive and more convenient than the use of an apparatus that is effectively raised to allow the ceiling mounted device to be reached. A lift apparatus that is mounted on or in a ceiling may be used to lower a device mounted thereon when it is desirable for the device to be physically accessible. In one embodiment, a Power ever Ethernet (PoE) source may provide electrical current over data cable to power the device when the device is in use, and to power the lift apparatus when the device is to be lowered from the ceiling or raised to the ceiling. That is, power from a PoE source may be diverted between the device and a motor that powers a lift apparatus. As such, power is substantially only used by a lift apparatus when the lift apparatus is needed to lower or raise a device.

Figure 1:
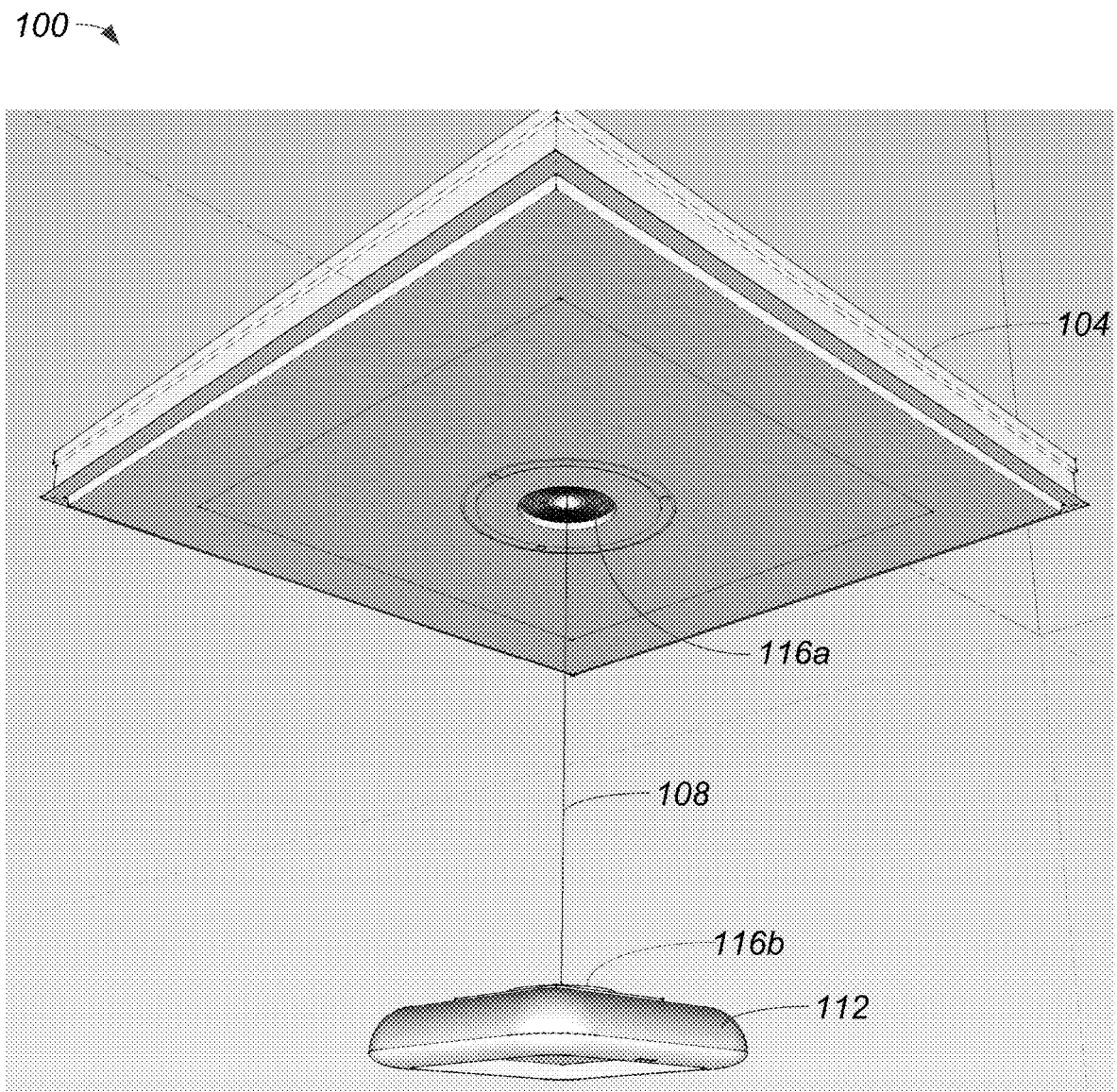
FIG. 1 is a diagrammatic representation of a system which includes a Power over Ethernet (PoE) lift apparatus to lower and/or to raise a ceiling mounted device in accordance with an embodiment.

Referring initially to FIG. 1, a system which includes a PoE lift apparatus configured to lower and/or to raise a ceiling mounted device will be described in accordance with an embodiment. A system 100 includes a ceiling tile, an enclosure, or a body 104 that may be incorporated into a ceiling and a device 112 such as a wireless access point, an Internet protocol (IP) camera, an environmental sensor, or an LED light. In one embodiment, body 104 may be an integral part of a ceiling, e.g., body 104 may be formed as part of a ceiling. System 100 also includes a PoE lift apparatus which includes a cable 108, a connection mechanism that includes a first plate 116a and a second plate 116b, and a motor (not shown). Body 104 may be arranged to contain components which allow power to be effectively diverted between device 112 and the PoE lift apparatus.

As shown, device 112 is lowered to a distance below body 104 by a motor (not shown) which may also be a part of the PoE lift apparatus. Cable 108 may be used to lower, and to raise, device 112 relative to body 104. First plate 116*a* and second plate 116*b* each include conductive portions, e.g., rings, which are arranged to conduct power from a PoE source (not shown) that is in communication with first plate 116*a*, and to provide the power to device 112 when first plate 116*a* and second plate 116*b* are in physical contact. When first plate 116*a* and second plate 116*b* are not in contact, as shown, power is effectively diverted away from device 112 and may be used to power a motor (not shown) which allows cable 108 to lower and to raise device 112.

Figure 2:
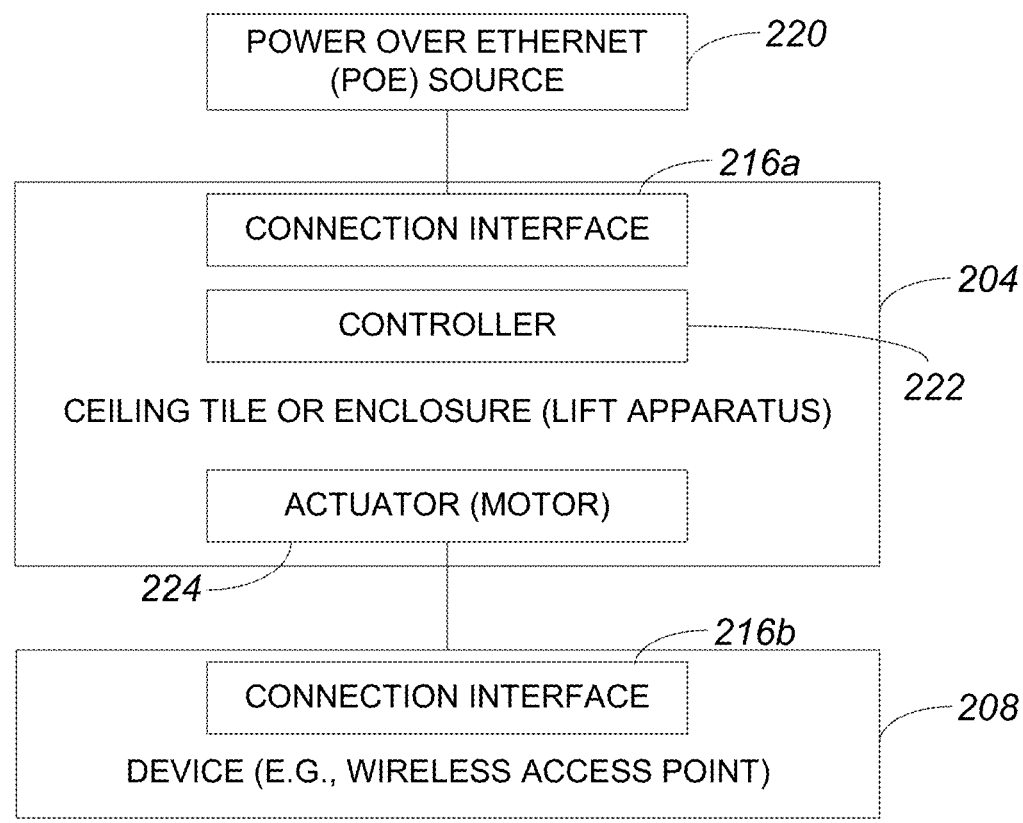
FIG. 2 is a block diagram representation of a system which includes a PoE lift apparatus and a device in accordance with an embodiment.

FIG. 2 is a block diagram representation of a system which includes a PoE lift apparatus and a device in accordance with an embodiment. A system 200 includes a PoE source 220 which is arranged to provide electrical current that generally either powers a device 208 or a motor 224. PoE source 220 is connected to a conductive connection interface 216*a* that is part of a body 204, e.g., a ceiling tile or enclosure, which, in conjunction with a conductive connection interface 216*b*, effectively forms a PoE lift apparatus. Connection interface 216*a* is arranged to cooperate with connection interface 216*b* to provide power from PoE source 220 to device 208 when connection interface 216*a* and connection interface 216*b* are in contact. Connection interface 216*a* may be a first plate and connection interface 216*b* may be a second plate that each include conductive portions. Connection interface 216*b* may be substantially attached to device 208, or may be integrally formed as a part of device 208. When connection interface 216*b* is attached to device 208, connection interface 216*b* may be communicably coupled to device 208 using a cable (not shown) such as an Ethernet cable such that power may be substantially transferred from connection interface 216*b* to device 208.

Body 204 is arranged to control a controller 222 and an actuator 224, e.g., a motor. Controller 222 is configured to determine when power from POE source 220 is to be diverted from device 208 to actuator 224 when actuator 224 is needed to lower or to raise device 208. In one embodiment, substantially all available power from PoE source 220 may be provided to device 208 when connection interface 216*a* and connection interface 216*b* are in contact. It should be appreciated, however, that a majority of available power from PoE source 220 may instead be provided to device 208 when connection interface 216*a* and connection interface 216*b* are in contact, with a relatively small amount of power being provided to controller 222 such that controller 222 may determine when the contact between connection interface 216*a* and connection interface 216*b* is established and/or broken. Controller 222 is generally arranged to control the distribution of available power from PoE source 220, and may generally include hardware and/or software logic arranged to be executed by a processor.

Actuator 224, when provided with power from PoE source 220, may lower device 208 with respect to body 204, as for example for maintenance purposes. Alternatively, if device 208 is already lowered with respect to body 204, actuator 224, when powered, may raise device 208 with respect to body 204. In general, actuator 224 is arranged to be powered when connection interface 216*a* and connection interface 216*b* are not in contact, and arranged to effectively not be powered when connection interface 216*a* and connection interface 216*b* are in contact. In one embodiment, actuator 224 may be coupled to a cable (not shown) which may facilitate the lowering and/or raising of device 208.

Figure 3:
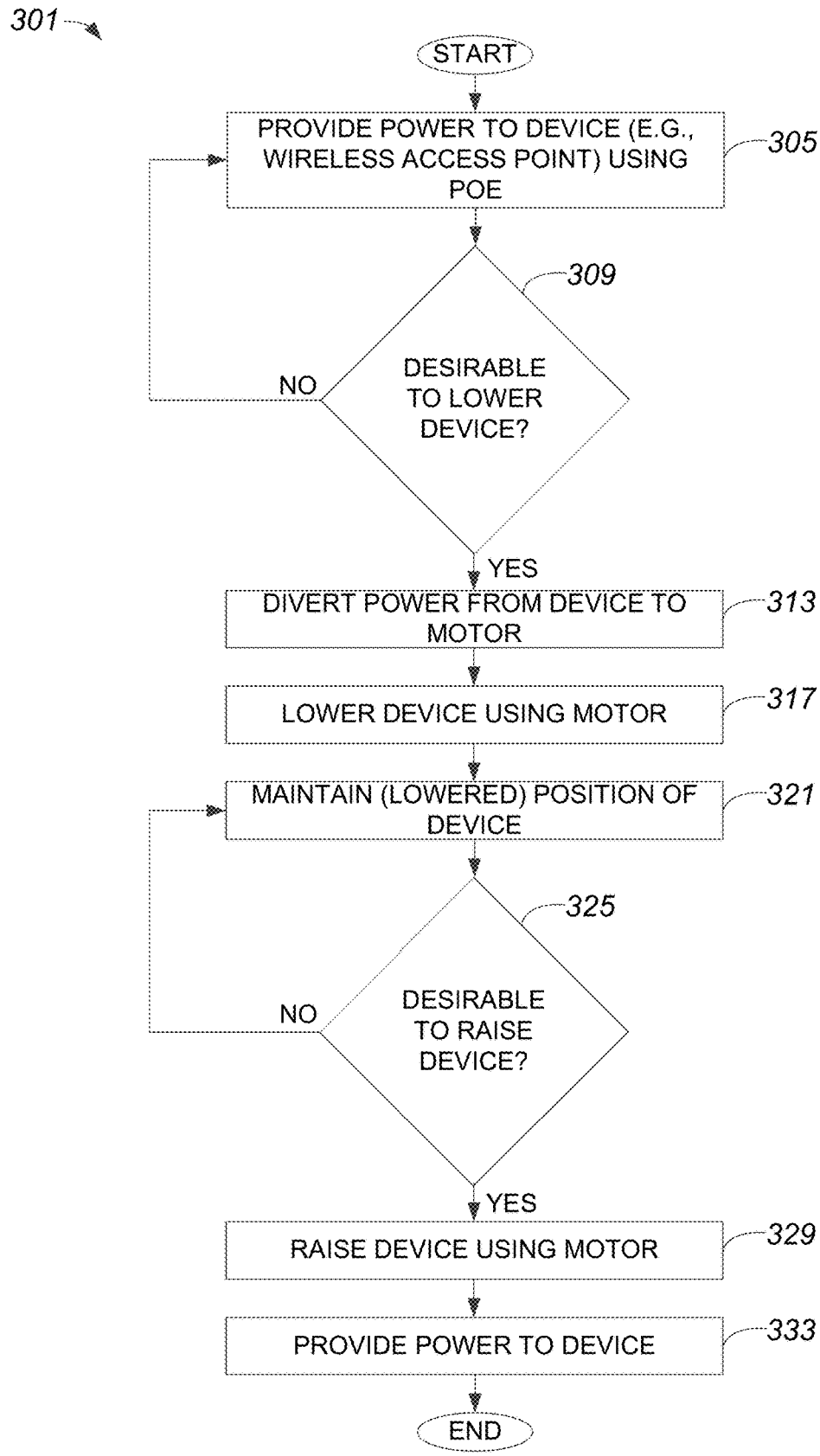
FIG. 3 is a process flow diagram which illustrates a method of using a PoE lift apparatus to move a device, e.g., a ceiling-mounted device, in accordance with an embodiment.

With respect to system 200, device 208 may be mounted on a ceiling for use, and may be lowered from the ceiling for maintenance purposes. The PoE lift apparatus which includes body 204 and connection interface 216*b* is arranged to allow device 208 to be moved between a ceiling and a lower position. FIG. 3 is a process flow diagram which illustrates a method of using a PoE lift apparatus to move a device, e.g., a ceiling-mounted device, in accordance with an embodiment. A method 301 for using a lift apparatus to move, e.g., raise or lower, a device begins at step 305 in which power is provided to a device that is located in, or substantially positioned on, a ceiling. Power is generally provided to the device while the device is in its normalized or home position. In one embodiment, the device may be a wireless access point that is powered using PoE. The device is mounted on, or otherwise coupled to, a lift apparatus. It should be appreciated that when power is provided to the device, the lift apparatus is provided either with substantially no power or with relatively little power compared to the amount of power provided to the device. Lift apparatus generally includes a motor that is arranged to lower and to raise the device with respect to a vertical axis.

A determination is made in step 309 as to whether it is desirable to lower the device. It may be desirable to lower the device, for example, for maintenance purposes. If the determination is that it's not desirable to lower the device, then power continues to be provided to the device in step 305.

Alternatively, if it is determined in step 309 that it is desirable to lower the device, process flow moves to step 313 in which power is effectively diverted from the device to the lift apparatus or, more specifically, to the motor included in the lift apparatus. It should be appreciated that diverting the power from the device to the motor typically includes providing substantially no power to the device. Any suitable mechanism may be used to divert power from the device to the motor. As will be discussed below with respect to FIGS. 5A, 5B, 6A, 6B, 7A, and 7B, one mechanism used to divert power from the device to the motor may involve the use of plates that are separated to divert power from the device to the motor.

After power is diverted from the device to the motor, the device is lowered in step 317 using the motor. The distance by which the device is lowered may be predetermined, e.g., the distance may be a set distance, or the distance by which the device is lowered may be dynamically controlled, e.g., by an administrator, based upon factors such as a desired height for a particular purpose. Once the device is lowered to a desired position, the desired position of the device is maintained in step 321. Maintenance may be performed on the device while the device is in a desired, or lowered, position. For example, if the device is lowered for troubleshooting purposes, the device may be tested while in the lowered position to identify any issues with the device.

A determination is made in step 325 as to whether it is desirable to raise the device. If the determination is that it is not desirable to raise the device, the device is maintained in a lowered position in step 321. If, however, the determination is that it is desirable to raise the device, the implication is that the device is to be returned to its normalized position. Accordingly, if it is determined to be desirable to raise the device, the device is raised using the motor in step 329. After the device is raised back to its normalized position, power is provided to the device in step 333. It should be appreciated that providing power to the device generally involves diverting a majority of the available power the device. Once power is provided to the device, the method of using a lift apparatus to move a device is completed.

Figure 4A:
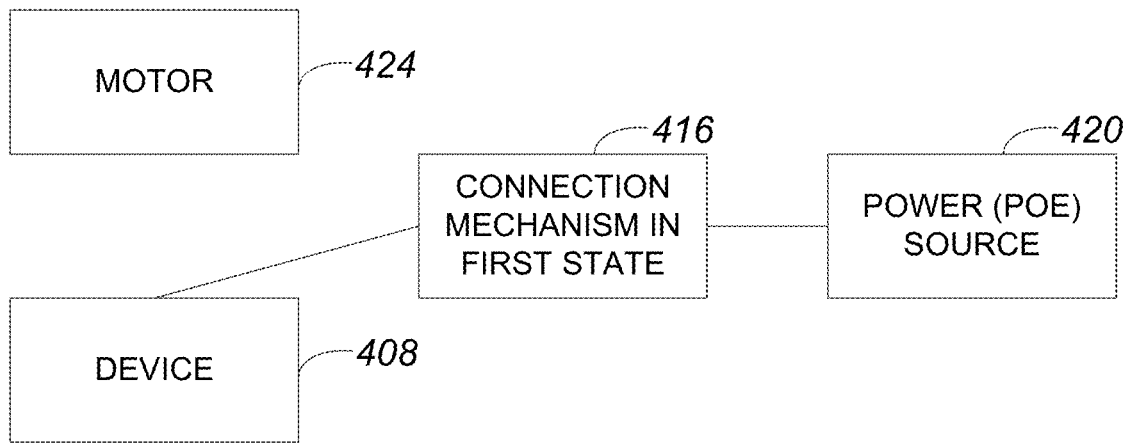
FIG. 4A is a diagrammatic representation of power being provided to a device using a connection when the connection is in a first state in accordance with an embodiment.
Figure 4B:
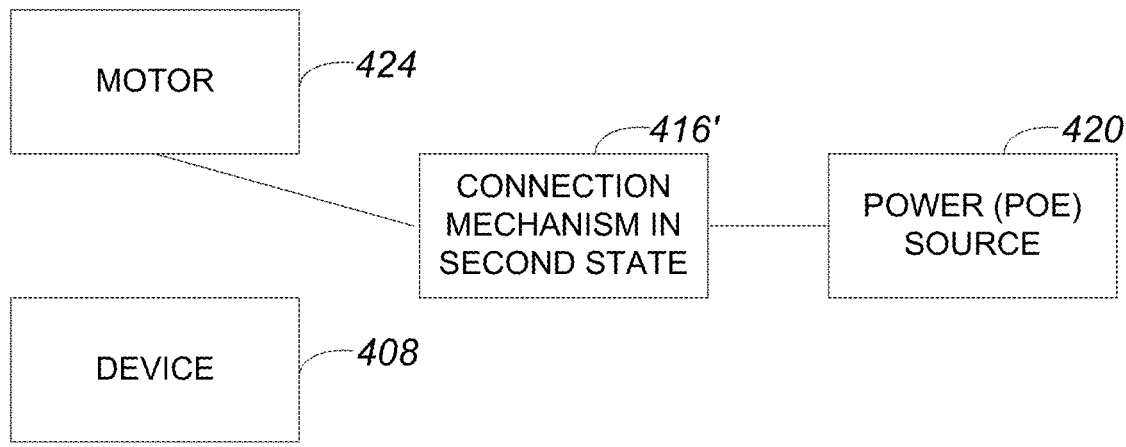
FIG. 4B is a diagrammatic representation of power being provided to a device using a connection, e.g., device 408 and connection 416 of FIG. 4A, in accordance with an embodiment.

As mentioned above, any suitable mechanism may be used to effectively switch PoE power from being provided to a device to being provided to a motor that is part of a lift apparatus, and vice versa. In general, a connection mechanism that is connected to a power source may be arranged to either provide a majority of available power to a device or provide the majority of available power to the motor. With reference to FIGS. 4A and 4B, a mechanism that allows power to be "switched" between a motor and a device such as an access point will be described in accordance with an embodiment. FIG. 4A is a diagrammatic representation of power being provided to a device using a connection when the connection is in a first state or orientation. A device 408 is generally coupled to a motor 424 such that motor 424, when activated, may cause device 408 to move. A connection mechanism 416, when in a first state, causes power from a power source 420 to be provided to device 408. In general, substantially all available power from power source 420 may be provided to device 408. However, in one embodiment, when connection mechanism 416 is in a first state, a majority of available power from power source 420 is provided to device 408 while a relatively small portion of the available power may be provided to the lift apparatus (not shown) that includes motor 424.

As shown in FIG. 4B, when in a second state or orientation, connection mechanism 416' provides substantially all available power from power source 420 to motor 424. As a result, connection mechanism 416' effectively prevents power from being provided from power source 420 to device 408.

A connection mechanism 416 such as shown in FIGS. 4A and 4B may generally be any suitable mechanism which allows power to be passed either to a motor or to a device that is arranged to be moved by the motor. In one embodiment, connection mechanism 416 includes two plates, i.e., plates that are arranged to conduct electricity, such that when the plates are in contact, power is passed to device 408. Conversely, when connection mechanism 416 includes two plates, power is substantially prevented from being passed to device 408 when the two plates are not in contact. One plate may be substantially fixed to a lift apparatus, while the other plate may be substantially fixed to a device that is arranged to be moved by the lift apparatus.

Figure 5A:
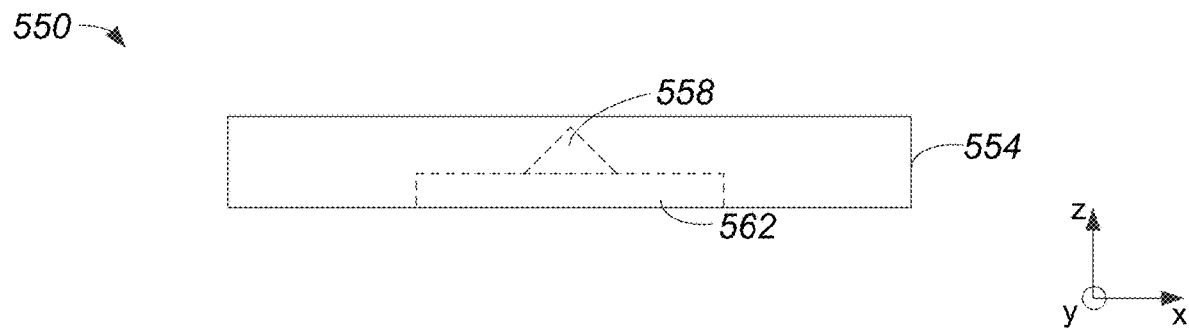
FIG. 5A is a diagrammatic side view representation of a fixed portion of a lift apparatus in accordance with an embodiment.
Figure 5B:
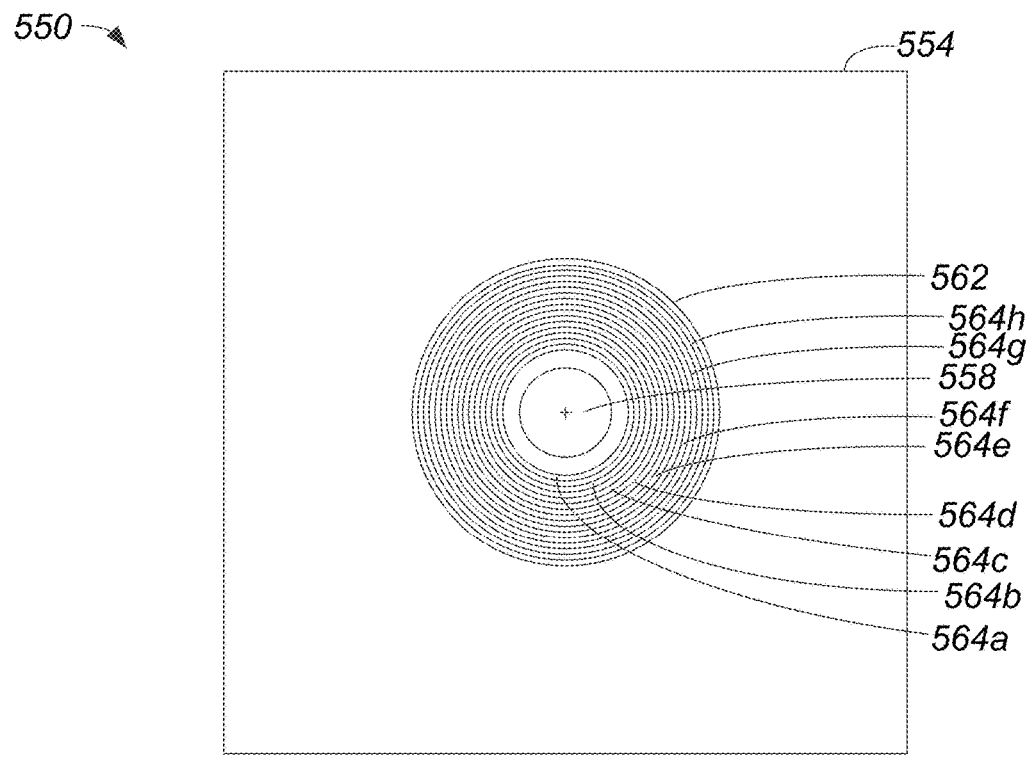
FIG. 5B is a diagrammatic top view representation of a fixed portion of a lift apparatus, e.g., fixed portion 550 of FIG. 5A, in accordance with an embodiment.

A connection mechanism associated with a lift apparatus that includes two plates includes one plate that is substantially fixed on the lift apparatus, or is a fixed portion of the lift apparatus, and one plate, e.g., a moving plate, that is coupled to a device that may be lifted. The fixed portion of the lift apparatus may be attached to, integrated into, otherwise a part of a ceiling. FIG. 5A is a diagrammatic side view representation of a fixed portion of a lift apparatus in accordance with an embodiment, and FIG. 5B is a diagrammatic top view representation of the fixed portion of the lift apparatus in accordance with an embodiment. A fixed portion 550 of a lift apparatus includes a body portion 554 that effectively houses a plate or disk 562 as well as an alignment feature 558. Plate 562 includes a plurality of substantially concentric rings 564a-h which, when in contact with a corresponding plate (not shown) on a moving portion of the lift apparatus, creates a connection as will be discussed below with respect to FIGS. 7A and 7B. The number of concentric rings 564a-h may vary widely. In the embodiment as shown, plate 562 includes approximately eight concentric rings 564a-h, which effectively correspond to the approximately four pairs of copper cable which are typically used in an Ethernet cable. Concentric rings 564a-h may be formed from any suitable conductive material, e.g., copper. The width of concentric rings 564a-h may generally vary widely, and rings 564a-h may have a relatively small radius. In one embodiment, each ring 564a-h may be approximately 0.125 inches in width, with the space between adjacent rings 564a-h being between approximately 0.125 inches and approximately 0.25 inches. The radius of rings 564a-h may be between approximately 1.5 inches and approximately 2.0 inches, total, for substantially all rungs 564a-h.

Alignment feature 558 is arranged to allow a moving portion (not shown) of the list apparatus to be relatively accurately positioned with respect to fixed portion 550. Alignment feature 558 may be a cone-shaped opening defined in body portion 550 which is arranged to receive a cone-shaped protrusion associated with a corresponding plate (not shown) on a moving portion of the lift apparatus.

Figure 6A:
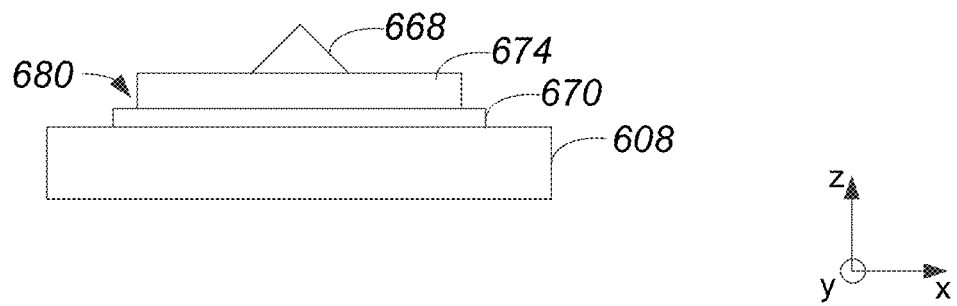
FIG. 6A is a diagrammatic side view representation of a moving portion of a lift apparatus in accordance with an embodiment.
Figure 6B:
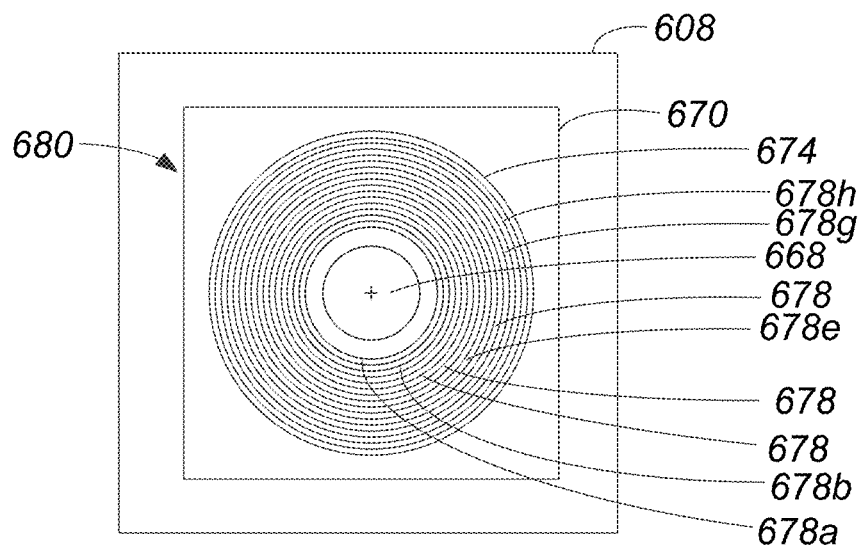
FIG. 6B is a diagrammatic top view representation of a moving portion of a lift apparatus, e.g., moving portion 680 of FIG. 6A, in accordance with an embodiment.

FIG. 6A is a diagrammatic side view representation of a moving portion of a lift apparatus, which is coupled to a device that is to be lifted by the lift apparatus, and FIG. 6B is a diagrammatic top view representation of a moving portion of the lift apparatus in accordance with an embodiment. A moving portion 680 of a lift apparatus is arranged to be coupled to a device 608, as for example a wireless access point. Moving portion 680 includes a mounting body 670 that is arranged to interface with device 608, a plate 674, and an alignment feature 668. Plate 674 includes a plurality of substantially concentric rings 678a-h which, when in contact with a corresponding plate (not shown) on a fixed portion of the lift apparatus, creates a connection as will be discussed below with respect to FIGS. 7A and 7B. The number of concentric rings 678a-h may vary widely. Plate 674 may include any number of concentric rings 678a-h, e.g., approximately eight concentric rings 678a-h which effectively correspond to the approximately four pairs of copper cable which are typically used in an Ethernet cable.

Alignment feature 668 is arranged to substantially fit into a corresponding alignment feature on a fixed portion (not shown) of the lift apparatus such that concentric rings 578a-h may substantially connect with concentric rings on the fixed portion. By way of example, alignment feature 668 may fit into alignment feature 558 of FIGS. 5A and 5B such that concentric rings 678a-h come into contact with concentric rings 564a-h to create an electric connection such that power may pass through concentric rings 564a-h to concentric rings 678a-h.

Figure 7A:
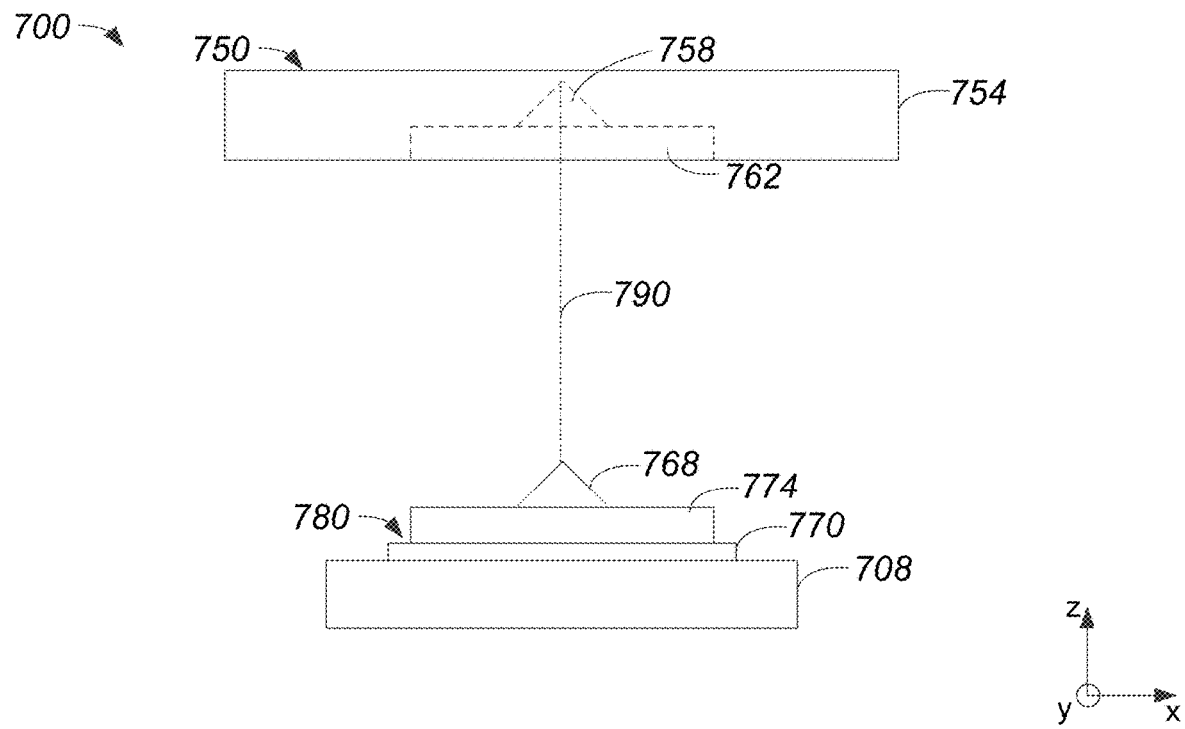
FIG. 7A is a diagrammatic representation of a system in with a device in a lowered position in accordance with an embodiment.

When a fixed portion of a lift apparatus and a moving portion of a lift apparatus are not in physical contact, e.g., when concentric rings of a fixed portion are not in physical contact with concentric rings of a moving portion, a PoE source may provide substantially all available power to the lift apparatus and substantially no available power to a device coupled to the moving portion of the lift apparatus. FIG. 7A is a diagrammatic representation of a system in with a device in a lowered position in accordance with an embodiment. A system 700 includes a device 708 that is supported by a lift apparatus which includes a fixed portion 750 and a moving portion 780. Fixed portion 750 and moving portion 780 are joined by a cable 790 which is substantially deployed or extended by a motor (not shown) to lower device 708, and substantially retracted by the motor to raise device 708. As shown, cable 790 is deployed such that device 708 is in a lowered position.

Fixed portion 750 includes a body 754 which may be incorporated into a ceiling tile, or may be a ceiling tile. A plate 762 and an alignment feature 758 are also included in fixed portion 750.

Moving portion 780, which is a portion of the lift apparatus which is coupled to device 708, includes an alignment feature 768, a plate 774, and a coupling portion 770 that is arranged to couple device 708 to moving portion 780. When cable 790 is deployed, moving portion 780 is effectively suspended below fixed portion 750 relative to a z-axis.

Figure 7B:
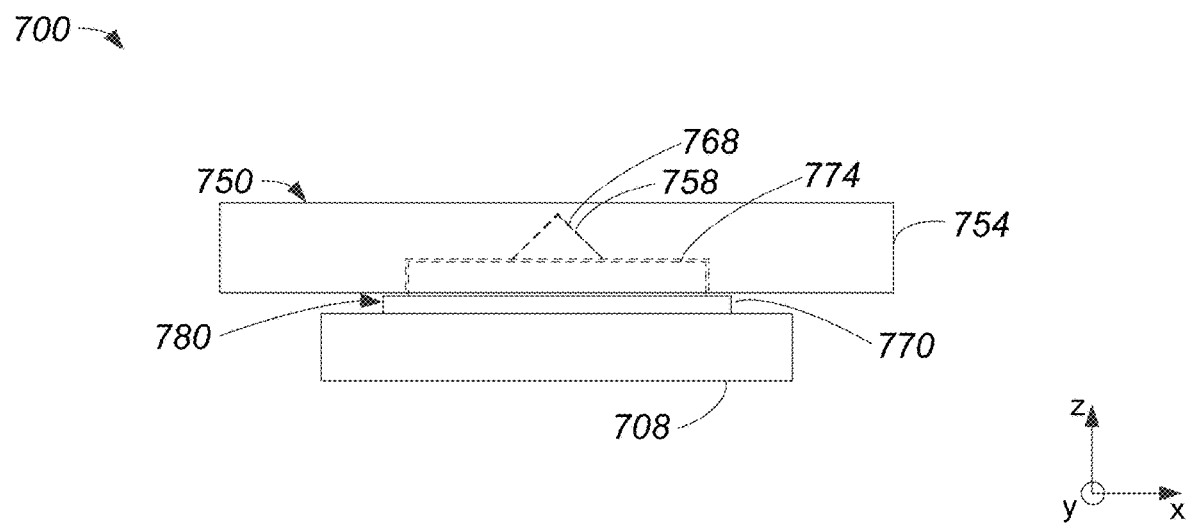
FIG. 7B is a diagrammatic representation of a system, e.g., system 700 of FIG. 7A, in which a device is in a normalized or home position in accordance with an embodiment.

FIG. 7B is a diagrammatic representation of system 700 in which a device 706 is in a normalized or home position in accordance with an embodiment. When device 706 is in a normalized position, plate 774 and plate 762 are in physical contact such that an electrical connection is essentially made between plate 774 and plate 762. When plate 774 and plate 762 are in physical contact such that an electrical connection is made, e.g., such that concentric conductive rings (not shown) on plate 774 are in physical contact with concentric conductive rings (not shown) on plate 762, alignment feature 768 is interfaced with alignment feature 758. In one embodiment, when plate 774 and plate 762 are in physical contact, alignment feature 768, which is a conical protrusion, is effectively positioned within alignment feature 758, which is a conical opening or cavity.

Figure 8:
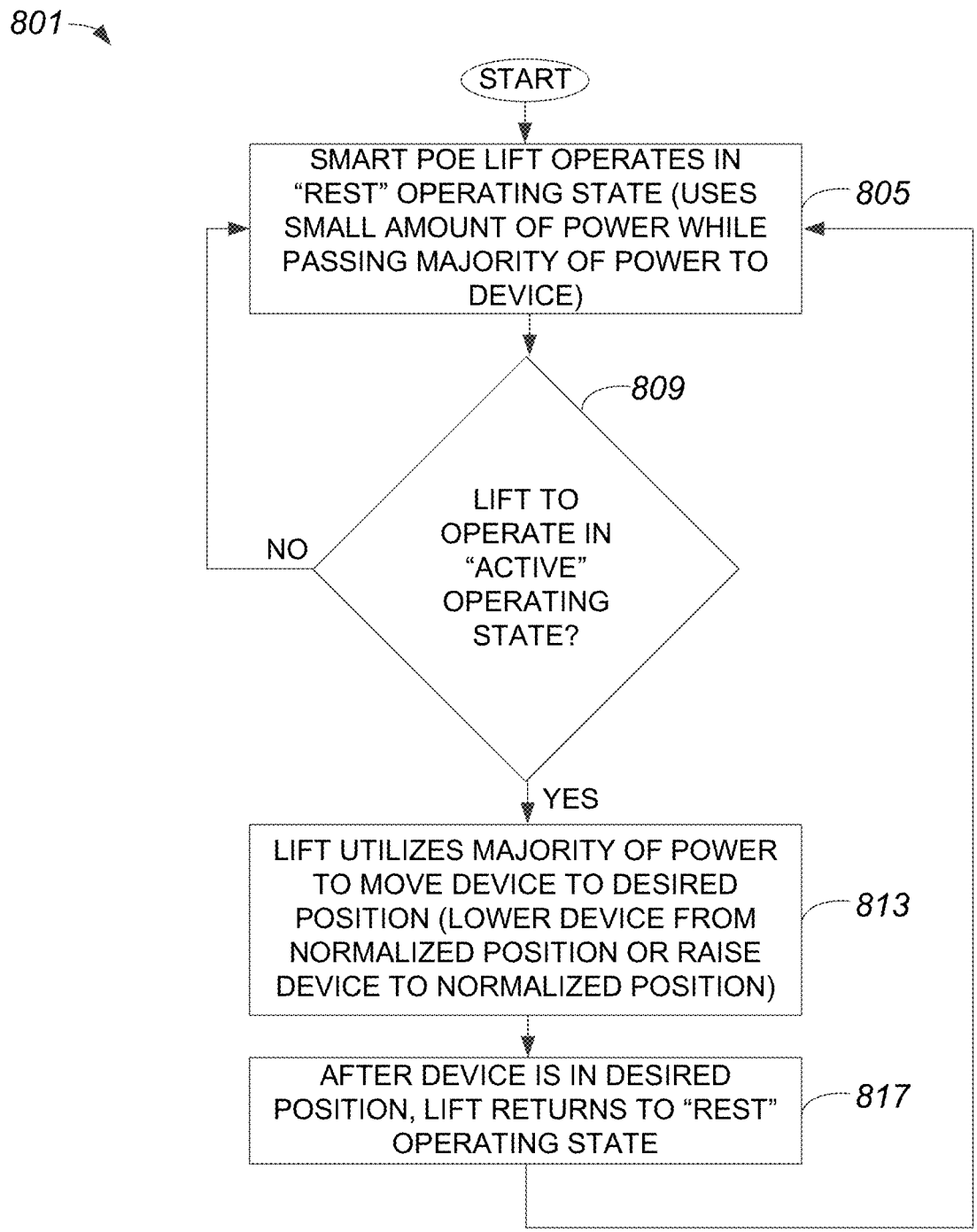
FIG. 8 is a process flow diagram that illustrates a method of operating a smart PoE lift in accordance with an embodiment.

With reference to FIG. 8, a method of operating a lift will be described in accordance with an embodiment. A method 801 of operating a list begins in step 805 in which the lift operates in a rest operating state, or an operating state in which the lift utilizes a small amount of available PoE power while the majority of the available PoE power is passed to a device, e.g., an access point, that is supported by the lift. When the lift is operating in a rest operating state, it should be appreciated that a motor included in the lift is generally not powered on. The small amount of power provided to the lift when the lift is in a rest operating state may generally be used to provide power to a controller that is arranged to allow the lift to determine when it needs to switch from a rest operating state to an active operating state.

In step 809, it is determined whether the lift is to operate in an active operating state. That is, a determination is made as to whether the lift is needed to either lower the device or to raise the device. If the determination in step 809 is that the list is not to operate in an active operating state, process flow returns to step 805 in which the lift continues to operate in a rest operating state.

Alternatively, if the determination in step 809 is that the list is to operate in an active operating state, the indication is that the device is either to be lowered or raised from its current position. Accordingly, in step 813, the majority of the available power is shifted from use by the device to use by the lift, and the lift moves the device to a desired position. Moving the device to a desired position may include, but is not limited to including, lowering the device from a normalized position and raising the device to a normalized position.

Once the device is in the desired position, the lift returns to a rest operating state in step 817. That is, the lift stops utilizing the majority of available power and passes the majority of available power to the device. From step 817, process flow moves to step 805 in which the lift continues to operate in a rest operating state.

Although only a few embodiments have been described in this disclosure, it should be understood that the disclosure may be embodied in many other specific forms without departing from the spirit or the scope of the present disclosure. By way of example, while a device that may be moved by a smart PoE lift may be wireless access point wireless access point, an IP camera, an environmental sensor, or an LED light, a device that may be moved by a smart PoE lift is not limited to being a wireless access point, wireless access point, an IP camera, an environmental sensor, or an LED light. A device may generally be, but is not limited to being, substantially any suitable device which utilizes power from a PoE source to operate. For example, a suitable device may be a sensor such as a smoke detector, a fire detector, a carbon monoxide detector, a temperature sensor, and/or a leak detector sensor. A suitable device may also be a camera, e.g., a PTZ style dome camera.

The use of two plates to effectively cause a connection, and to effectively break a connection, between a PoE power source and a lift has generally been described. It should be appreciated that the use of two plates is one example of a connection mechanism, and that many other suitable connection mechanisms may be implemented in lieu of, and/or in addition to, two plates. Similarly, although the use of concentric rings, which effectively correspond to pairs of copper cable used in standard Ethernet cables, on the plates is effective in providing connections, the disclosure is not limited to the use of concentric rings.

A fixed portion of a PoE lift has been described as having an alignment feature that is arranged to receive an alignment feature located on a moving portion of the PoE lift such that when the alignment feature of the fixed portion receives the alignment feature of the moving portion, a connection, e.g., an electrical connection, is made. Alignment features are not limited to being cone shaped, and may be any suitable shape. Further, alignment features may include keyed features which are configured to effectively force a particular orientation for a moving portion relative to a fixed portion.

As described above, a PoE lift may utilize a relatively small amount of power while the PoE lift is in a rest, or normalized, operating state. It should be appreciated, however, that in some embodiments, the PoE lift may use substantially no power when the PoE lift is in a rest operating state. For example, a different source of power such as a battery may be used to provide the PoE lift with enough power when the PoE lift is in a rest operating state to enable a controller associated with the PoE lift to determine when the PoE lift is to transition from the rest operating state to an active operating state.

While a PoE lift has been described as being used to lower and to raise a device, it should be appreciated that a PoE lift may also move a device in a lateral direction, e.g., along a horizontal axis in addition to a vertical axis. In other words, a PoE lift or, more generally, a PoE apparatus that is coupled to a device to substantially control the movement of the device, may be arranged to cause translational movement along more than one axis.

A PoE lift may include various components, e.g., sensors, which are arranged to allow facilitate the position of a device supported by the PoE lift. For example, a PoE lift may include sensor arrangements configured to enable the PoE lift to be lowered a particular amount or raised a particular amount. In one embodiment, to avoid damaging a PoE lift and/or a device supported by the PoE lift, the PoE lift may include a sensor arrangement which detects when there is an obstruction in the path along which the device is to be moved and, thus, may stop the movement of the device in order to substantially avoid contact between the device and the obstruction.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, logic associated with a controller which diverts power between a device and a motor may be embodied as physical arrangements, modules, or components in a ceiling tile or enclosure associated with a PoE lift apparatus. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
providing power to a device, the device being supported by a lift apparatus which includes a first part, a second part, and an actuator, wherein the device is coupled to the second part and arranged to obtain power through the second part when the first part and the second part are arranged in a first orientation, wherein the device is in a first position when the first part and the second part are in the first orientation;
determining when the device is to be moved to a second position;
diverting the power from the device to the actuator when it is determined that the device is to be moved to the second position; and
moving the device to the second position using the actuator, wherein moving the device is moving from the second position using the actuator includes causing the first part and the second part to be arranged in a second orientation.

2. The method of claim 1 wherein when the first part and the second part are in the first orientation, the actuator is not provided with the power and the first part and the second part are coupled such that power passes from the first part to the second part.

3. The method of claim 1 wherein the lift apparatus further includes a cable, the cable being coupled to the actuator, and wherein moving the device to the second position using the actuator includes lowering the device from the first position to the second position using the cable.

4. The method of claim 1 wherein the power is provided to the first part by a Power over Ethernet (PoE) source.

5. The method of claim 1 wherein when the power is provided to the actuator, the actuator is arranged to cause the cable to move the second part vertically with respect to the first part.

6. The method of claim 1 wherein the first part includes a controller, the controller being arranged to cause the power to be provided to the actuator.

7. The method of claim 1 wherein the first part is mounted on a ceiling and moving the device to the second position comprises moving the device vertically away from the first part to provide access to the device.

8. The method of claim 1 further comprising moving the device from the second position to the first position.

9. The method of claim 1 wherein the first part comprises a first conductive portion and the second part comprises a second conductive portion.

10. The method of claim 9 wherein power passes from the first conductive portion to the second conductive portion when the device is in the first position.

11. The method of claim 1 wherein the device comprises a wireless access point.

12. A method comprising:
providing power to a device comprising a second conductive connector in contact with a first conductive connector in a first position, the first conductive connector coupled to a ceiling mounted body;
determining at a controller, that the device is to be moved away from the ceiling to a second position; and
diverting the power from the device to an actuator operable to move the device from the first position to the second position.

13. The method of claim 12 further comprising moving the device from the first position to the second position using a cable coupled to the actuator.

14. The method of claim 12 wherein the power provided to the actuator is provided by a Power over Ethernet (PoE) source.

15. A method comprising:
providing a first amount of power to a controller located within an enclosure comprising a first plate;
providing a second amount of power to a device coupled to a second plate when a first conductive connector coupled to the first plate is in physical contact with a second conductive connector coupled to the second plate; and
diverting the second amount of power from the device to an actuator coupled to the second plate to move the device relative to the first plate;
wherein the controller is operable to control distribution of the second amount of power to the device and to the actuator.

16. The method of claim 15 wherein the enclosure is mounted on the ceiling and the actuator lowers the device away from the ceiling.

17. The method of claim 15 wherein the actuator is coupled to the second plate with a cable.

18. The method of claim 15 wherein the second amount of power is provided by a Power over Ethernet (PoE) source.

19. The method of claim 18 wherein the first amount of power is provided by the PoE source, the first amount of power being less than the second amount of power.

20. The method of claim 15 wherein the first conductive connector comprises a first conductive ring and the second conductive connector comprises a second conductive ring configured to contact the first conductive ring when the first conductive connector is in physical contact with the second conductive connector, and wherein the second amount of power passes from the first conductive ring to the second conductive ring.

* * * * *